United States Patent [19]

Polleys

[11] 3,831,479
[45] Aug. 27, 1974

[54] COUPLING DEVICE FOR A CUTTING MACHINE

[75] Inventor: Herbert R. Polleys, New Haven, Conn.

[73] Assignee: Wellman Company, Medford, Mass.

[22] Filed: Nov. 23, 1971

[21] Appl. No.: 201,418

[52] U.S. Cl.............. 83/380, 12/86.6, 83/571, 83/699, 287/60, 24/232
[51] Int. Cl............................................ A43d 7/08
[58] Field of Search ............ 12/86.6, 86.65; 24/232, 24/241 PS, 241 S, 241 P; 83/380, 571, 698, 699; 287/60

[56] References Cited
UNITED STATES PATENTS
2,430,964  11/1947  Stuart .............................. 12/86.6

Primary Examiner—J. M. Meister
Attorney, Agent, or Firm—Philip Sands

[57] ABSTRACT

A coupling device for use in a cutting machine, the coupling device being interposed between and connectable to a clamp actuating assembly and a cutter drive unit. The coupling device includes a turnbuckle coupling member having an eyelet which may be hooked upon or, alternatively, unhooked from a hook presented by a second coupling member. The coupling device enables a machine operator to inactivate the cutter drive unit when adjustment of the clamp actuating assembly is to be effected.

10 Claims, 4 Drawing Figures

PATENTED AUG 27 1974 3,831,479
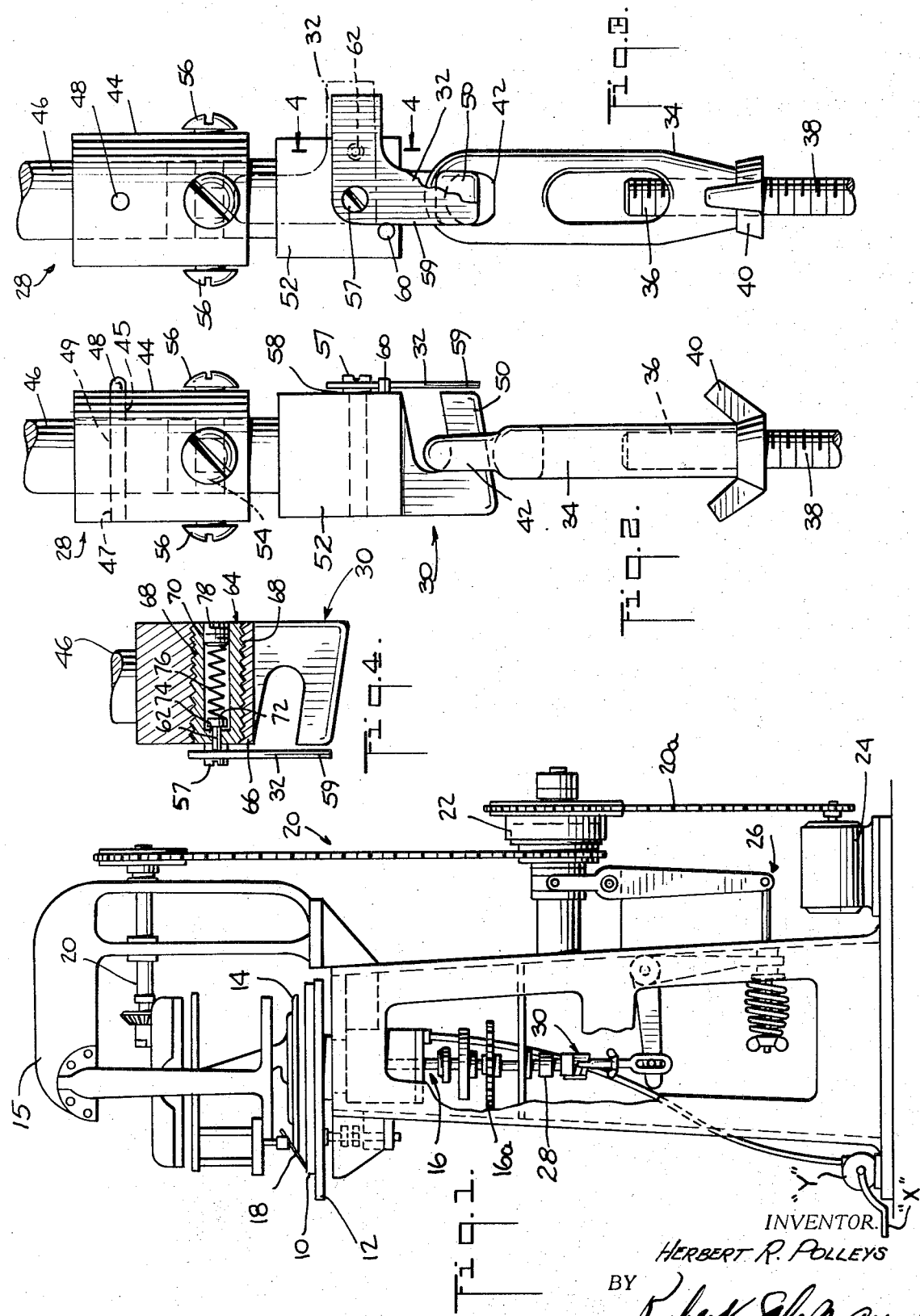
INVENTOR.
HERBERT R. POLLEYS
BY
Robert Selyman
ATTORNEY

COUPLING DEVICE FOR A CUTTING MACHINE

BACKGROUND OF THE INVENTION

This invention relates to a machine for cutting sheet material, such as stock material for shoe soles, and more particularly concerns a coupling device mounted in a cutting machine for detachably connecting the cutting member to the support member thereof.

The cutting machine for which the present invention is an improvement is illustrated and described in U.S. Pat. No. 2,430,964, issued on Nov. 18, 1947 to C. J. Stuart. As described in the aforementioned patent, the cutting machine includes a stationary frame, a support member or table for holding the stock material thereon, a piston-cylinder apparatus for moving the table, and a cutting member or knife assembly. The table is adapted for reciprocal movement in a vertical (upward and downward) direction so as to clamp the stock material thereon against an abutment such as a cutting form or pattern extending from the stationary frame of the machine. The clamping pressure exerted by the table and abutment on the stock material interposed therebetween prevents the stock material from slipping from the pattern or form during the cutting operation. A conventional mechanical linkage connects the knife assembly with the table through a clutch so that the knife assembly is rotatably actuated around the form or pattern automatically, when the table rises to a preselected position in which the stock material is pressed against the form abutment. The clamping pressure is regulated by the clearance space between the table and abutment. In order to apply the requisite clamping pressure to stock material of varying consistencies and thicknesses, the clearance space therebetween is suitably adjusted by means of a hand wheel, beneath the table so as to be less than the thickness of the stock material. Hence, the mechanical linkage includes an adjustable link which permits the clearance space between the table and abutment to be varied so as to stop the table at the appropriate preselected distance from the abutment to thereby apply the necessary clamping pressure for tightly securing the stock material therebetween and preventing stock slippage during the cutting operation.

It is customary to disconnect the knife assembly drive mechanism from the table prior to adjusting the clearance space between the table and abutment unless the motor is shut off and has come to a full stop. Otherwise, it is apparent that the knife assembly would be actuated when the rising table reaches the pre-selected position to engage the clutch thereby making it impractical to adjust the clearance space therebetween while the rotating knife assembly is in motion. There are also times when it is necessary for the operator to remove broken or dulled blades, insert new ones, or to adjust same for proper angle and depth of cut. These operations are extremely hazardous unless the motor drive is at rest or the knife drive linkage assembly is previously disconnected. Heretofore, the knife assembly has been disconnected from the table by sliding a suitable latch in a vertically upwardly direction and holding the latch in the open position with one hand while unhooking a suitable turnbuckle from the mechanical linkage with the other hand. This is an extremely awkward and cumbersome operation necessitating that the operator use two hands in the performance thereof. The knife assembly is reconnected to the table in a similar manner, except that this procedure is the reverse of the aforementioned method of disconnecting the table from the knife assembly, i.e. the operator hooks the turnbuckle eye onto the mechanical linkage with one hand and holds the latch in the open position with the other hand. Thereafter, the operator slides the latch in a vertically downwardly direction to the closed position so as to lock the turnbuckle into engagement with the mechanical linkage. Thus, it is evident that the conventionally utilized coupling device is awkward, cumbersome and highly inefficient, thereby resulting in a considerable waste of production time and in ensuing higher product costs.

In order to overcome many of the disadvantages associated with the conventional turnbuckle and latch arrangement previously utilized in cutting machines for detachably connecting the cutting member to the support member therefore, there is, in accordance with the present invention, provided a coupling device operative with only one hand.

Accordingly, it is a primary object of the present invention to provide a coupling device which permits an operator to disengage readily the support member from the cutting member of a cutting machine so as to inactivate the latter.

Another object of the present invention is to provide a coupling device which is frictionally held in an open position during the adjustment of the clamping pressure applied to the sheet material secured in the cutting machine.

An additional object of the present invention is to provide a coupling device which permits an operator to use only one hand to engage or disengage the support member to and from the cutting member of a cutting machine so as to activate or deactivate the latter.

A further object of the present invention is to provide a coupling device which is relatively efficient, easily useable and more economically manufactured, in that a one piece hook member is now used whereas formerly a two piece member was required.

SUMMARY OF THE INVENTION

Briefly stated, and in accordance with the present invention, there is provided a coupling device associated with a cutting machine for detachably connecting the cutting member to the support member therefore. The coupling device of the present invention is adapted to facilitate the engagement and disengagement of the support member to and from the cutting member so as to enable the clamping pressure securing the sheet material onto the cutting machine to be easily adjustable. The coupling device also provides a safe means for knife blade replacements, angular adjustment and depth setting.

Preferably, the coupling device includes a coupling member with a hook end attached to a turnbuckle member. This coupling device is connected to the cutting member of the cutting machine by clutch engagement. The turnbuckle member has an aperture therein in the region of one end portion thereof so as to be readily hooked onto the coupling member or easily unhooked therefrom. An L-shaped member is adapted for pivotal movement from an open position to a closed position in which the turnbuckle is prevented from being unhooked from the coupling member. Thus, it is evident that the cutting member may be readily detached from the support means merely by pivoting the L-shaped latch member to the open position and unhooking the rod from the coupling member.

BRIEF DESCRIPTION OF THE DRAWINGS

Other objects and advantages of the present invention will become apparent upon reading the following detailed description and upon reference to the drawings in which:

FIG. 1 is a side elevational view of a sole cutting machine having parts of the frame thereof broken away so as to depict the preferred embodiment of the present invention in situ;

FIG. 2 is an enlarged fragmentary side elevational view of the preferred embodiment of the present invention showing the latch thereon in a closed position;

FIG. 3 is an enlarged fragmentary front elevational view of the preferred embodiment of the present invention; and FIG. 4 is an enlarged partial side elevational sectional view taken along the line 4—4 in FIG. 3.

While the present invention will be described in connection with a preferred embodiment, it will be understood that it is not intended to limit the invention to that embodiment. On the contrary, it is intended to cover all alternatives, modifications and equivalents as may be included within the spirit and scope of the invention as defined by the appended claims.

DETAILED DESCRIPTION OF THE INVENTION

With reference to the drawings, wherein like reference numerals have been used throughout to designate like elements, FIG. 1 shows a sole-cutting machine of the type specifically described in U.S. Pat. No. 2,430,964 for the purpose of illustrating the preferred embodiment of the latch of the present invention in situ.

A sheet material or shoe sole stock material 10 is depicted as being disposed upon a support member or table 12 usually mounted and slidable on a cutting pad (not shown) which is adapted to be driven vertically upwardly and lowered by gravity in a downward direction (toward and away from abutment 14 secured to stationary frame 15) by suitable clamp actuating means such as a conventional one way fluid, piston-cylinder apparatus, shown generally at 16. Foot pedal X is depressed causing a three way air valve "y" to allow fluid under pressure to flow into the cylinder apparatus, thus raising table assembly 12. Removing one's foot from the pedal allows the pressurized air to escape to the atmosphere causing table 12 to drop by gravity to release the secured material 10. When table 12 is lifted to a preselected position, stock material 10 is clamped between table 12 (or a cutting pad, if used) and abutment 14 with a predetermined pressure. The clamping pressure is controlled by adjusting the clearance space between table 12 and abutment 14 by means of hand wheel 16a so as to be less than the thickness of stock material 10 by a degree which will not to cause distortion of the material. Immediately after the desired clamping pressure is attained, i.e., after table 12 has reached the preselected limited position in its upwardly directed movement, a cutting member or knife assembly shown generally at 18, is actuated in response thereto so as to cut stock material 10 into suitable soles or other shapes as required. Stock material 10 is clamped tightly in place by table 12 and abutment form 14 so as to prevent movement during the cutting thereof by knife assembly 18 as it is driven around abutment 14.

Knife assembly 18 is driven by a suitable endless chain and miter gear drive, depicted generally at 20 which, in turn, is driven by a suitable clutch 22 connected by belt 20a detachably to a suitable drive motor 24. Clutch 22 is connected to drive motor 24 only when stock 10 engages abutment 14, i.e. when the requisite clamping pressure is applied thereto by having table 12 reach the preselected position in its upwardly directed movement so that the clearance space between table 12 and abutment 14 is suitably less than the thickness of stock material 10 and its cutting pad (not shown). The action of clutch 22 in connecting and disconnecting knife assembly 18 to and from drive motor 24 is controlled by a mechanical linkage, indicated generally at 26, secured at one end thereof to clutch 22 and at the opposite end thereof to table 12 by the coupling device of the present invention which is designated generally at 28. Coupling device 28 connects piston-cylinder apparatus 16 with mechanical linkage 26 so as to cause clutch 22 to be engaged by drive motor 24 when table 12 has reached the preselected position in its upward movement, thereby actuating knife assembly 18 when the requisite clamping pressure is attained.

The connecting portions of table 12 and knife assembly 18 are detachably fastened to one another by coupling device 28. Thus, by disconnecting coupling device 28, the knife assembly 18 may be rendered inoperative.

Table 12 may be moved in a vertically upward direction for adjusting the clearance space between it and abutment 14 to vary the clamping pressure to correspond to the thickness and consistency of stock 10 being cut. With the coupling device of this invention, such adjustment can be made without automatically actuating knife assembly 18.

Referring to FIGS. 2 and 3, coupling device 28 includes a coupling member, designated generally at 30, an L-shaped latch member 32 and a turnbuckle member 34. Turnbuckle 34 has an internally threaded socket 36 at one end thereof which is adapted to threadedly receive an externally threaded shaft portion 38 of the connecting portion of mechanical linkage 26. A suitable wing nut 40 is also threadedly secured on the externally threaded shaft portion 38. Wing nut 40 is adjusted thereon so as to press against one end of turnbuckle 34 to thereby lock turnbuckle 34 in any adjusted position. The turnbuckle member 34 has an aperture 42 in the region of the other end portion thereof so as to enable it to be hooked onto a hooked end 50 of coupling member 30. Thus, by unhooking turnbuckle 34 from coupling member 30, knife assembly 18 is rendered inoperative.

An adapter sleeve member 44 is fastened to a rod 46 which extends via an intermediate mechanical linkage from the piston of piston-cylinder apparatus 16. Adapter 44 is a tubular member having a pair of colinear holes 45 and 47 in opposed walls thereof. The adapter 44 is mounted slidably on rod 46 in such a way that holes 45 and 47 therein are in registry with hole 49 in rod 46. Thereafter a taper pin 48 is inserted through adapter 44 and rod 46, i.e. taper pin 48 passes through holes 45 and 47 in adapter 44 and hole 49 in rod 46, so as to constrain adapter 44 in place on rod 46.

The coupling member 30 includes preferably the hook 50 at one end thereof, and a substantially cylindrical portion 52 of reduced diameter at the other end thereof. Aperture or eyelet 42 in turnbuckle 34 is readily detachable from hook 50 to disconnect knife assembly 18 from table 12. Cylindrical portion 52 of coupling member 30 has a groove 54 therein which extends around the periphery thereof and slidably projects into the adapter 44. Adapter 44 includes a plurality of internally threaded screw holes passing through the wall thereof (four such holes, for example. Screws 56 are adapted to be threadedly secured in the walls of adapter 44 such that the end portions thereof project into groove 54. In this manner the cylindrical portion 52 of the coupling member 30 is mounted rotatably within adapter 44, which in turn is connected to table 12 via an intermediate mechanical linkage connected to the piston and table plate assembly of piston-cylinder apparatus 16. Thus in the illustrated embodiment coupling member 30 may be rotated relative to adapter 44 so that aperture 42 of turnbuckle 34 may be removed from hook 50 when turnbuckle 34 points towards the front of the machine.

Turning now to FIG. 3, the latch or L-shaped member 32 is attached pivotably to coupling member 30 by means of pivot screw 57 which is threadedly secured to coupling member 30. A washer 58 is interposed about pivot screw 57 between arcuate member 30 and L-shaped member 32 so as to permit L-shaped member 32 to pivot readily. L-shaped member 32 is supported for pivotal movement so that it may be turned between a closed position, indicated in solid line in FIG. 3 and an open position indicated in phantom in FIG. 3. In the closed position, leg 59 of L-shaped member 32 blocks the open end portion of hook 50 so as to prevent turnbuckle end 42 from being unhooked therefrom. The leg 59 may, however, be pivoted counterclockwise away from the open end portion of hook 50 so that turnbuckle 34 may be readily disengaged or unhooked therefrom. Stop pin 60, which is disposed on coupling member 30, provides a positive reference means for limiting the pivotal movement of L-shaped member 32. Stop pin 60 accomplishes the stopping action by contacting leg 59 of L-shaped member 32 as the L-shaped member pivots clockwise. Accordingly, stop pin 60 limits the pivotal movement of L-shaped member 32 so that leg 59 thereof is properly aligned to block the open end region of hook 50. Stop pin 60 may be suitably attached to coupling member 30 by being pressed or threaded into a suitable hole in coupling member 30. It will be apparent to a man skilled in the art that stop pin 60 need not be a separate element, but may merely be a suitable boss protruding from coupling member 30.

The coupling device 28 preferably includes latch control means whereby L-shaped member 32 is frictionally held in place relative to coupling member 30. The friction means are such that L-shaped member 32 may be pivoted manually to any desired position relative to coupling member 30 and will be held by friction forces in the position to which it is moved against the action of normal loads and other forces imposed on L-shaped member 32 during ordinary use. L-shaped member 32 may be maintained as shown in the closed or open position, or, any intermediate position by the frictional forces exerted thereon by detent means 62 mounted resiliently in coupling member 30.

Referring now to FIG. 4, detent means 62 is shown therein as being urged resiliently outwardly by biasing means, indicated generally by reference numeral 64, so as to be pressed against the opposed surface of L-shaped member 32. Thus, the frictional force applied to L-shaped member 32 by detent 62 maintains L-shaped member 32 in a position relative to coupling member 30 and prevents it from pivoting freely when released by the operator. Coupling member 30 includes a threaded bore or aperture 66 extending therethrough with a threaded sleeve 68 having a central threaded passageway 70 therethrough. Detent 62 is adapted to be received in central passageway 70 of sleeve 68. A head 72, part of detent 62, engages an apertured end wall or shoulder 74 which extends inwardly from one end of portion sleeve 68, thereby preventing the ejection of detent 62 from aperture 66 by a helical compression spring 76. Biasing means 64 includes preferably the helical compression spring 76 which positioned within sleeve 68 and bears against head 72. The force of spring 76 is controlled by an adjustable screw 78 which is in threaded in a inner end portion of sleeve 68. It is evident that detent 62 need only have the end portion thereof pressing against L-shaped member 32 in order to develop sufficient frictional force to maintain L-shaped member 32 in selective positions relative to coupling member 30 during the machine clamping cycle, i.e. L-shaped member 32 will not pivot unless the frictional force applied thereto by detent 62 is overcome by the operator.

Hence, it is evident that the coupling device of the present invention is adapted to achieve the various aims and objectives hereinabefore set forth. Thus, the coupling device permits an operator to disengage readily the support member from the cutting member so as to render the latter inoperative, i.e. by pivoting the L-shaped member to the open position and unhooking the turnbuckle end from the coupling. The support member may be readily placed in engagement with the cutting member so as to activate the latter when the coupling device is in the coupled condition. This procedure is the reverse of the aforementioned procedure for disengaging the cutting member from the support member, i.e. the operator hooks the turnbuckle onto the coupling member and, thereafter, pivots the L-shaped member clockwise to its latched or closed position. The coupling device of the present invention is, therefore, relatively simple, easily useable, and economically manufactured. Furthermore, it permits one-handed operator control over connection or disconnection of the table lift mechanism and the motor drive train.

While the invention has been described in conjunction with a specific embodiment thereof, it is evident that many alternatives, modifications and variations will be apparent to those skilled in the art in light of the foregoing description. Accordingly, it is intended in the appended claims to embrace all such alternatives, modifications, and variations as fall within the spirit and broad scope of this invention.

Having thus described our invention, what I claim and desire to protect by Letters Patent is:

1. In a cutting machine having a frame, clamping means for constraining stock to be cut in a fixed position relative to said frame, cutting means movable relative to said stock for cutting the latter, clamp actuating means for exerting pressure by said clamping means against said stock, and cutter drive means for operating said cutting means to cut said stock, the improvement comprising: coupling means interposed between and connected to said clamp actuating means and said cutter drive means; said coupling means including a turnbuckle assembly having an eyelet, and a turnbuckle support assembly terminating in a hook upon which is removably mounted said eyelet; said turnbuckle support assembly including manually controllable latch means mounted on said hook for movement from a closed hook position preventing said eyelet from being removed from said hook to an open hook position permitting said eyelet to be removed from said hook, and latch control means for removably maintaining said latch means in said open and closed hook positions.

2. In a machine as claimed in claim 1, including means for supporting said latch means upon said hook such that said latch means may be selectively turned to and from said open and closed hook positions.

3. In a machine as claimed in claim 2, wherein said latch means is pivotally supported on said hook.

4. In a machine as claimed in claim 3, wherein said latch means includes a substantially L-shaped member presenting a first leg for at least partially closing said hook and a second leg for manipulation.

5. In a machine as claimed in claim 1, wherein said latch control means includes friction-inducing means pressing against said latch means to removably maintain the latter in any position between said open and closed hook positions.

6. In a machine as claimed in claim 5, wherein said friction-inducing means includes a spring confined in a bore formed in said hook, and a detent element urged by said spring against said latch member.

7. In a machine as claimed in claim 6, including a sleeve member threadedly constrained in said bore, said sleeve member terminating axially in an apertured end wall of reduced diameter, said detent member including a head portion conforming in size with and constrained in said sleeve, and an axially extending body of reduced diameter protruding through said end wall and contacting said latch means.

8. In a machine as claimed in claim 1, including reference stop means secured upon said hook at a position such that said latch means when moved to said closed hook position is engageable with said stop means.

9. In a cutting machine having a frame, clamping means for constraining stock to be cut in a fixed position relative to said frame, cutting means movable relative to said stock for cutting the latter, clamp actuating means for exerting pressure by said clamping means against said stock, and cutter drive means for operating said cutting means to cut said stock, the improvement comprising: coupling means interposed between and connected to said clamp actuating means and said cutter drive means; said coupling means including a turnbuckle assembly having an eyelet, and a turnbuckle support assembly terminating in a hook upon which is removably mounted said eyelet; said turnbuckle support assembly including manually controllable latch means mounted on said hook for movement from a closed hook position preventing said eyelet from being removed from said hook to an open hook position permitting said eyelet to be removed from said hook, and means for supporting said latch means upon said hook such that said latch means may be selectively turned to and from said open and closed hook position.

10. In a machine as claimed in claim 9, wherein said latch means is pivotally supported on said hook.

* * * * *